US006429612B1

(12) United States Patent
Kume et al.

(10) Patent No.: US 6,429,612 B1
(45) Date of Patent: Aug. 6, 2002

(54) FAST STOPPING METHOD FOR INDUCTION MOTORS OPERATING FROM VARIABLE FREQUENCY DRIVES

(75) Inventors: Tsuneo J. Kume; Mahesh M. Swamy, both of Waukegan, IL (US)

(73) Assignee: Yaskawa Electric America, Inc., Waukegan, IL (US)

( * ) Notice: Subject to any disclaimer, the term of this patent is extended or adjusted under 35 U.S.C. 154(b) by 0 days.

(21) Appl. No.: 09/538,211

(22) Filed: Mar. 30, 2000

(51) Int. Cl.[7] .................................................. H02P 5/00
(52) U.S. Cl. ....................................... 318/139; 318/807
(58) Field of Search ................................ 318/139, 801, 318/719, 722, 732, 807

(56) References Cited

U.S. PATENT DOCUMENTS

| | | | | |
|---|---|---|---|---|
| 3,860,858 A | * 1/1975 | Nola | .......................... | 318/801 |
| 6,002,219 A | * 12/1999 | Permuy | ...................... | 318/139 |
| 6,150,776 A | * 11/2000 | Potter et al. | ................ | 318/139 |

FOREIGN PATENT DOCUMENTS

| | | |
|---|---|---|
| JP | 4315465 | 11/1992 |

OTHER PUBLICATIONS

Rastogi, Mukul and Peter Hammond, "Dual Frequency Braking in AC Drives", *2000 IEEE*, 0–7803–5695–0/00.

Jiang, J. and J. Holtz, "An Efficient Braking Method for Controlled AC Drives with a Diode Rectifier Front End", *2000 IEEE*, 0–7803–6404–0/00.

* cited by examiner

*Primary Examiner*—Khanh Dang
(74) *Attorney, Agent, or Firm*—Wood, Phillips, Katz, Clark & Mortimer

(57) ABSTRACT

A control for an induction motor operated by a variable frequency drive (VFD) includes a control unit adapted to control the VFD in a normal mode or a stopping mode. The normal mode comprises controlling the VFD at a select commanded operating frequency to control speed of the induction motor. The stopping mode comprises controlling the VFD at a substantially lower commanded operating frequency to operate the induction motor at a high negative slip condition to rapidly stop rotation of the induction motor.

12 Claims, 3 Drawing Sheets

FIG. 3
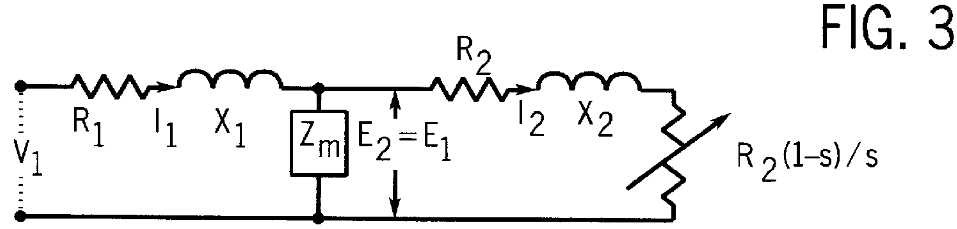
FIG. 4
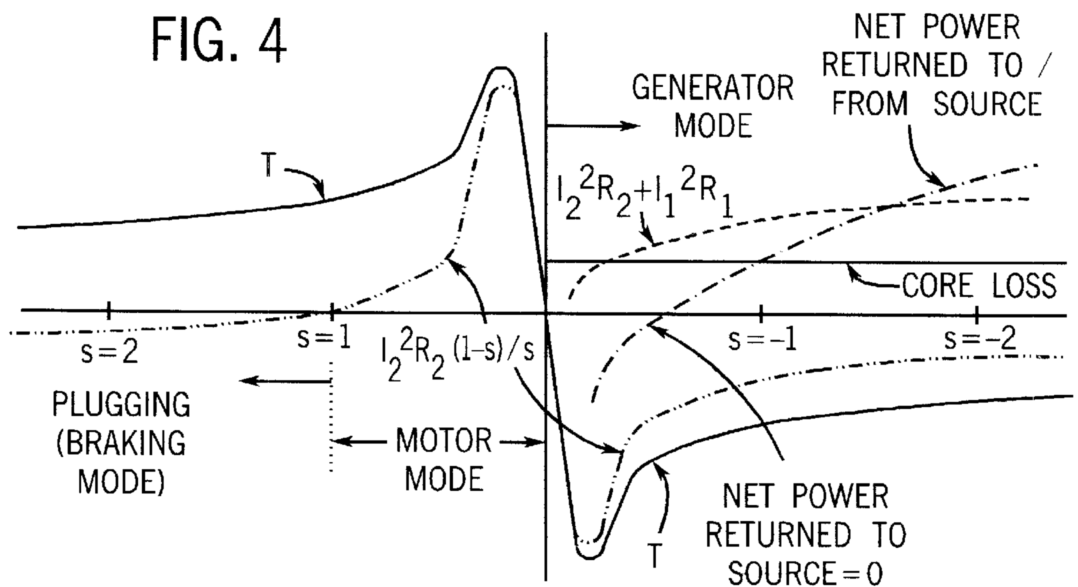
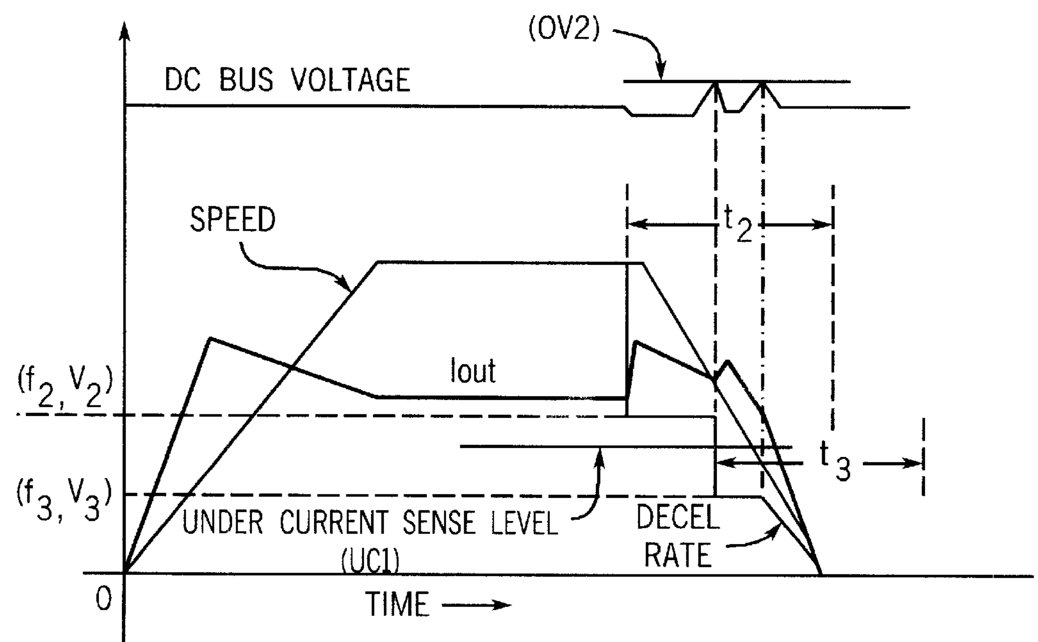
FIG. 6

FAST STOPPING METHOD FOR INDUCTION MOTORS OPERATING FROM VARIABLE FREQUENCY DRIVES

FIELD OF THE INVENTION

This invention relates to variable frequency drives and, more particularly, to a fast stopping method for an induction motor operating from a variable frequency drive.

BACKGROUND OF THE INVENTION

A motor drive system, in one known form, comprises an AC source supplying three-phase AC power to a variable frequency drive (VFD). The VFD includes an AC/DC converter connected by a DC link or bus to a DC/AC converter. The DC/AC converter may comprise a pulse width modulated inverter using insulated GATE bipolar transistors (IGBTs).

Speed and torque control of induction motors using VFDs has become universally accepted in the industry. Speed control includes stopping as well as reducing speed of a rotating load. Many applications require rapid stopping of a rotating motor. There are two (2) common stopping methods used in adjustable speed drives (ASDs). These are coasting and decelerated stop. In the coasting method, the control signals for turning on and off the inverter IGBTs are turned off and no voltage is provided to the motor. The motor coasts to a stop. The time taken for the motor to come to rest depends upon the inertia of the rotor-load combination. If the inertia is not large, then the rotor takes a long time to come to rest. In the decelerated stopping method, the motor is commanded to operate at a reduced frequency, and thus speed. The commanded operating frequency (speed) is gradually reduced to bring the motor to rest. Due to the inertia of the rotor-load combination, the speed cannot be reduced instantaneously. Generally, the user can select a predetermined rate of deceleration, which can be adjusted depending on the application. Since the commanded speed is lower than the actual rotating speed of the rotor-load, the motor starts behaving like an induction generator. In other words, the motor enters negative slip operation. Slip is defined as the ratio of the difference between the commanded speed and actual speed to the commanded speed. The commanded speed is also known as synchronous speed $\omega_s$. Mathematically, slip is defined as follows:

$$s = \frac{\omega_s - \omega_r}{\omega_s} \tag{1}$$

In equation (1), $\omega_r$ is the rotor speed or the actual rotating speed of the rotor-load combination. Note that slip, s, is a dimensionless quantity.

The mechanical energy in the rotor-load inertia is converted into electrical energy by the induction generator action. This energy is typically absorbed by the DC bus capacitors present in all ASDs. The voltage across the DC bus rises. Eventually, the excess energy is dissipated in the bleeding resistors present across the DC bus capacitors. In many cases, the energy in the moment of inertia is very large and it takes a long time for the energy to bleed off into bleed resistors. This delays the time it takes to stop a rotating load with large inertia. If the user selects a low deceleration time to bring the rotor-load combination to a rapid stop, then the rate of increase in voltage across the DC bus capacitors could be higher than the time constant of the bleed resistor and DC bus capacitor combination. This could result in an over-voltage trip condition at which time the VFD reverts to a coasting method to stop. Nuisance trips similar to those described above are highly undesirable and result in loss of production due to machine downtime. In order to circumvent this situation, many users employ external IGBT-resistor combinations. Such a unit is known as a "brake unit". The IGBT is turned on when the voltage across the DC bus exceeds a predetermined value. The excess energy is thus dissipated in the external resistors. The size and cost of the external IGBT-resistor combination is an added burden to the end user. The method of employing external resistors to achieve relatively faster stopping time is known as dynamic braking and the resistors are known as DB resistors.

The present invention is directed to solving one or more of the problems discussed above in a novel and simple manner.

SUMMARY OF THE INVENTION

In accordance with the invention, there is provided a fast stopping method for induction motors operating from variable frequency drives.

It is an object of the invention that the braking method does not cause an over voltage trip in the VFD.

It is another object of the invention that the braking method does not require the use of additional brake-units or regenerative units.

It is still another object of the invention that the method does not require use of a tachometer or encoder feedback.

It is still a further object of the invention that the method has a stopping time that is better or comparable to the method using additional brake units or regenerative units.

In accordance with the invention, the above objects are achieved in a fast stopping method known as large slip braking (LSB). The proposed method relies upon maintaining large slip between the commanded speed and the actual rotor speed to achieve fast stopping times.

Further features and advantages of the invention will be readily apparent from the specification and from the drawings.

BRIEF DESCRIPTION OF THE DRAWINGS

FIG. 3 is an equivalent circuit of an induction motor operating at a slip s;

FIG. 4 is a curve illustrating torque-slip and power in an equivalent variable resistor of a typical induction motor;

FIG. 6 is a time diagram representation of the proposed fast stopping method.

DETAILED DESCRIPTION OF THE INVENTION

Figure 1:
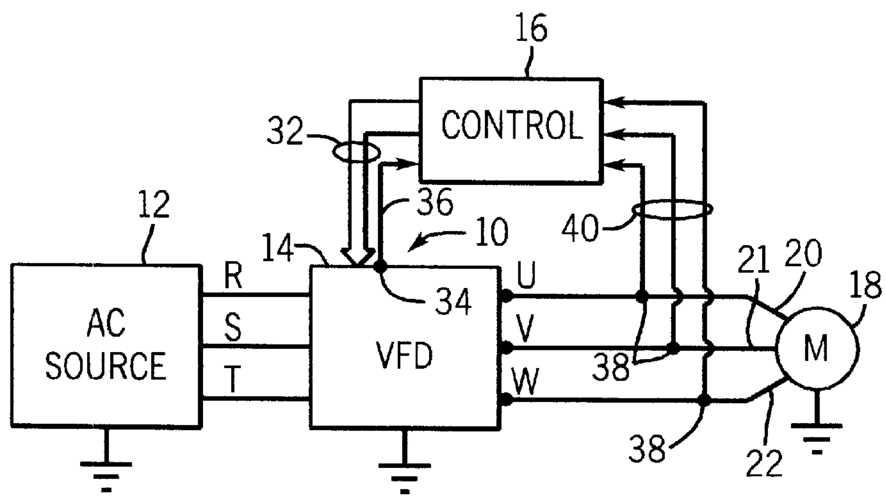
FIG. 1 is a generalized block diagram of a motor drive system including a control implementing a fast stopping method in accordance with the invention.

Referring initially to FIG. 1, a motor drive system 10 is illustrated. The motor drive system includes an AC source 12, a variable frequency drive (VFD) 14 and a control 16 for driving an induction motor 18. The AC source may comprise a drive or the like developing three-phase AC power on feeder conductors labeled R, S and T. The AC source 12 is grounded. The VFD 14, as described more particularly below, converts the AC power from the feeder conductors R, S and T, to DC power and converts it back to AC power at a select frequency which is then impressed across terminals U, V and W. The terminals U, V and W are connected to three (3) feeder conductors 20, 21 and 22 to drive the motor 18.

Figure 2:
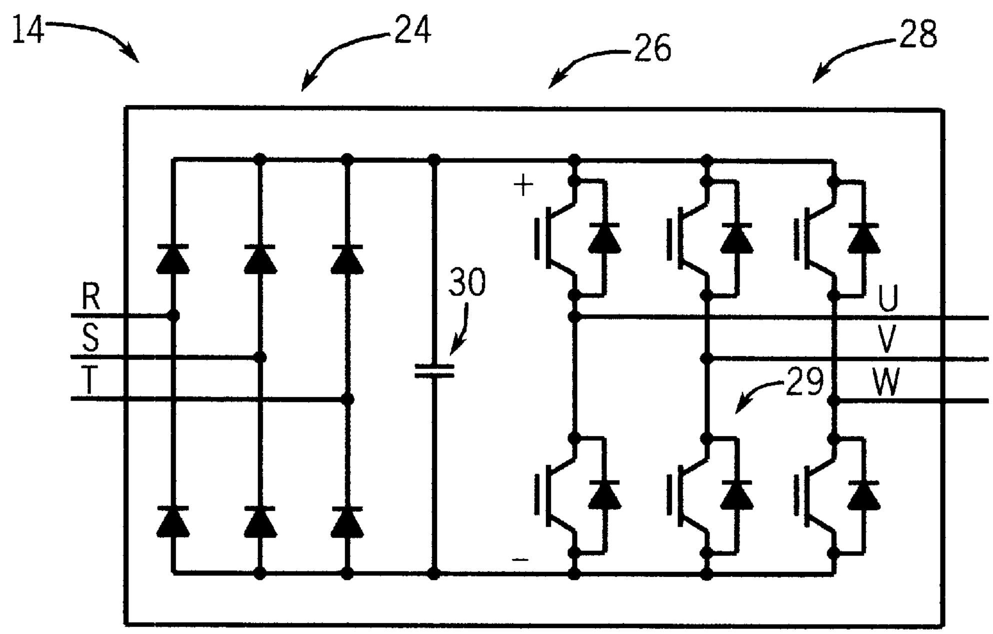
FIG. 2 is a schematic diagram of a variable frequency drive of the system of FIG. 1.

Referring to FIG. 2, a schematic diagram illustrates a typical circuit implementation for the VFD 14. The VFD 14 includes an AC/DC converter 24 connected by a DC bus 26 to a DC/AC converter 28. Particularly, according to the illustrated embodiment of the invention, the AC/DC converter 24 comprises a flow wave bridge rectifier circuit of conventional construction which is operable to convert three-phase AC power to DC power. The DC bus 26 includes a conventional filter 30. The DC bus 26 has rails labeled "+" and "−". The DC/AC converter 28 comprises an inverter section. Particularly, the inverter section 28 comprises a pulse width modulation (PWM) inverter, using insulated GATE bipolar transistors (IGBTs) 29. The six (6) IGBTs 29 are connected in a three-phase bridge configuration to the DC Bus to develop power at the terminals U, V and W. The IGBTs 29 are pulsed width modulated by signals on lines 32 from the control 16, see FIG. 1, using a conventional control scheme. Particularly, the PWM inverter 28 is controlled to create a sinusoidal effect for the induction motor 18. The pulse frequency used is fixed. The pulse width is varied to varied sinusoidal frequency.

Referring back to FIG. 1, the control 16 senses various parameters used in controlling the IGBTs 29 via signals on the line 32. Some of the sensed parameters are conventional, but not discussed herein as they do not relate specifically to the fast stopping method disclosed herein. A voltage sensor 34 senses DC bus voltage and is connected via a line 36 to the control 16. Current sensors 38 sense current on each of the conductors 20, 21 and 22 and are likewise connected to the control 16 via lines 40.

As is apparent, the control 16 is operable to pulse width modulate the IGBTs to vary sinusoidal frequency to control speed of the motor. The techniques for doing so are well-known and are not discussed herein. The present invention relates particularly to a fast stopping method for an induction motor 18 using a VFD 14.

In accordance with the invention, a large slip braking method is used for providing fast stopping of the motor 18. In order to achieve the fast stopping, it is important to understand that all methods have to rely upon converting mechanical energy stored in the form of inertia to electrical energy. The fast stopping method dissipates most of the electrical energy in the rotor circuit. This is explained via the motor equivalent circuit of FIG. 3 and the torque-slip curves shown in FIG. 4.

Referring initially to FIG. 3, the voltage $V_1$ is the per-phase input line to neutral voltage. The resistor $R_1$ represents the stator resistance. $I_1$ represents stator current. $X_1$ represents stator inductance. The block $Z_M$ represents the magnetizing inductance of the machine and core lost components. The resistance $R_2$ represents reflected rotor resistance at the stator side. The current $I_2$ represents rotor current. Inductance $X_2$ represents reflected rotor inductance. Finally, the variable resistance term $R_2$ (1−S)/S represents the reflected power component of the motor.

The rotor resistance $R_2$ is independent of operating slip s. $X_2$ is given by:

$$i\ X_2=2*\pi*f_3*L_2 \qquad (2)$$

$f_s$ is the synchronous frequency. $L_2$ is the inductance of the rotor circuit and includes the rotor leakage inductance. The power dissipated in the variable resistor term equals the electromagnetic output power. If slip is negative, then this power is negative also. This means that the machine enters generator mode of operation.

The proposed fast stopping method involves operating the induction motor 18 in the high negative slip region. Under these conditions, from the equivalent circuit shown in FIG. 3, the electromagnetic power output $I_2^2R_2(1-S)/S$ is negative since slip is negative. The available kinetic energy of the rotor-load combination provides for the mechanical losses and the remaining is converted into electrical energy by the induction generator action, which is represented by the variable resistance part of the motor equivalent circuit in FIG. 3.

The available electric power is a function of operating slip as shown in the power diagram in FIG. 4. A large part of this electrical power is dissipated in the rotor resistance $R_2$, a smaller part of it is dissipated in the stator resistance, $R_1$, and as core losses in the rotor and stator. The remaining is returned to the electrical source, i.e., the inverter 28 in the illustrated embodiment of the invention. In accordance with the invention, the operating slip is chosen so that the rotor and hence the stator current amplitudes are such that the available electric power is consumed by the rotor resistance, the stator resistance, and the motor core and nothing is returned back to the source. In other words, the induction generator is operated at a very low efficiency point. The operating slip at which point this happens can be approximately derived as follows:

$$I_2^2R_2*\left(\frac{1-s}{s}\right)+I_2^2R_2+I_1^2R_1+P_{core}=0 \qquad (3)$$

Using an approximate equivalent circuit of the motor 18, the stator current $I_1$ can be assumed to be equal to the rotor current $I_2$. It is important to note from equation 3 that the slip where the net power return to the source is zero depends strongly on the machine parameters. Further, if the core loss is assumed to be half of the total copper loss in the machine, and the stator resistance is approximately equal to half the rotor resistance, then on a rough approximation, the slip at which zero power is returned to the source occurs at $$I_2^2R_2*\left(\frac{1-s}{s}\right)+(I_2^2(15R_2))+(0.75I_2^2R_2)=0 \qquad (4)$$

$$\frac{1-s}{s}+2.25=0;\ s=-0.8$$

As described, equation 4 is only an approximation but indicates that such a point exists and occurs when the machine operates in the generator mode with a high value of negative slip. For the example given, if the induction motor is deliberately operated at a speed which is about fifty-five percent the speed of the rotating mass, then most of the mechanical energy in the rotating mass is absorbed by friction, rotor and stator winding losses, and core loss. Since this process takes place with high stator current, the mechanical energy is quickly converted and dissipated. In the absence of a constant mechanical prime moving action, the rotor-load mass will come to a fast stop. Thus, the present invention provides quick stopping by forcing the motor to operate as an induction generator with relatively high values of slip until the rotor-load combination has come down to a very low speed.

Under very high slip conditions, the amplitude of current increases tremendously and reaches the current locus limit given by $E_2/X_2$. The phase relationship between rotor current and induced voltage reaches almost ninety electrical degrees denoting low values of regenerative power being produced by the motor 18.

As the motor slip reduces, the commanded speed comes close to the actual speed. At zero speed they are equal. Hence, there is always a point in the speed curve where the slip is very low. In accordance with the invention, the low-slip point is forced to occur at a low speed at which point there is low mechanical energy remaining in the system.

The fast stopping method in accordance with the invention employs the simple V/F control method.

The control 16 of FIG. 1 comprises a microcontroller or the like and associated memory and other devices operating under accordance with a control program for controlling the VFD 14. Particularly, the control 16 analyzes the various input parameters and controls switching of the IGBTs 29 to varied sinusoidal frequency and thus motor speed.

Figure 5:
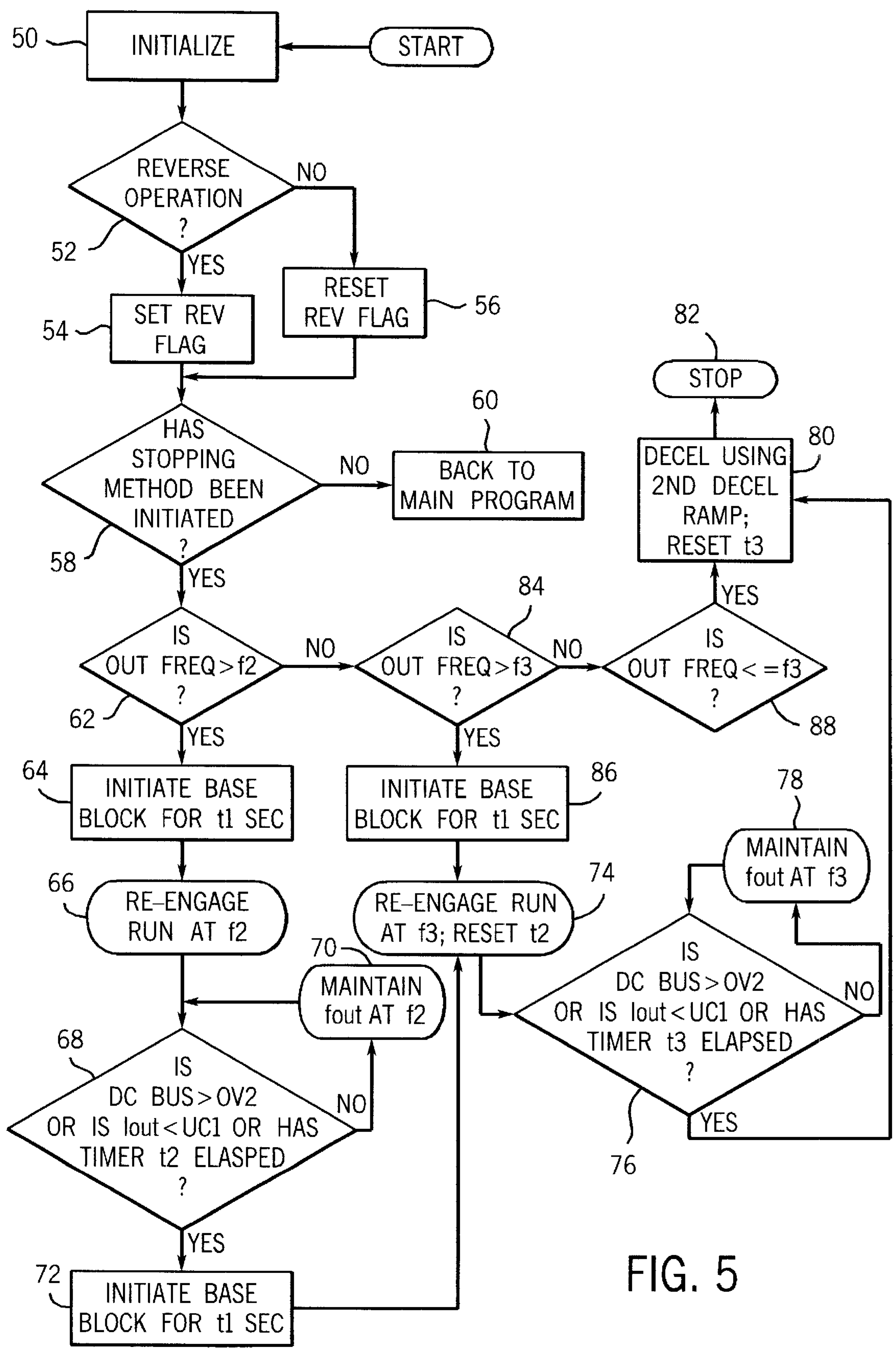
FIG. 5 is a flow diagram of the fast stopping method implemented in the control of FIG. 1.

Referring to FIG. 5, a flow diagram illustrates a program implemented in the control 16 of FIG. 1 for implementing the fast stopping method according to the invention. At startup, various setup parameters are initialized in block 50. These parameters include jump frequencies $f_2$ and $f_3$. The jump frequencies are frequencies below rated frequency to cause the motor to operate under high negative slip. These values may be user-selectable. In one embodiment, the jump frequency $f_2$ is set to be one-third of the base operating frequency. The jump frequency $f_3$ is set to be one-third of the jump frequency $f_2$. Other parameters that are preset are a base block time $t_1$ and fallback times $t_2$ and $t_3$. The base block time is used to de-energize the IGBT 6 for a select amount of time prior to change in commanded frequency. This is used to reset the control 16. The base block timer time $t_1$ may be, for example, in the order of one hundred milliseconds. Additional initialized parameters include the V/F pattern during the stopping method and DC Bus over-voltage trip level OV2 and per-phase under current trip level UC1.

A decision block 52 determines if the motor 18 is operating in a reverse direction. If so, then a reverse flag REV is set in block 54. If not, then the REV flag is reset in block 56. From either block 54 or 56, a decision block 58 determines if the stopping method has been initiated. If not, then control returns back to the main operating program (not shown) in block 60. If the stopping method has been initiated, then control proceeds to implement the fast stopping method in accordance with the invention.

The fast stopping method is initiated beginning in block 62 which determines if the current output frequency from the inverter 28 is greater than the jump frequency $f_2$. If so, then the base block timer is initiated for the time $t_1$ in block 64. As discussed above, this turns off all of the IGBTs 29. The inverter 28 is re-engaged to run at the jump frequency $f_2$ in block 66. This causes the motor 18 to operate with a high value of negative slip as the jump frequency $f_2$ is on the order of one-third of the base operating frequency. A decision block 68 evaluates for various conditions to determine when control at the first jump frequency $f_2$ should terminate. These conditions include whether the DC bus voltage is greater than OV2, or if the output current is less than UC1, or the fallback timer $t_2$ has elapsed. If none of these conditions have been satisfied, then the output frequency is maintained at $f_2$ in block 70 and the control loop loops back to the decision block 68.

Once any of the conditions in the block 68 has been satisfied, then the control proceeds to a block 72 which initiates the base block timer for $t_1$ seconds. Again, this has the effect of turning all of the IGBTs off. The inverter 28 is then re-engaged to run at the second jump frequency $f_3$ in block 74. The fallback timer $t_2$ is also reset. A decision block 76 then waits for various conditions to occur. These conditions are similar to those in the block 68, except that the second fallback timer $t_3$ is used, instead of the timer $t_2$. If none of these conditions occur, then the output frequency is maintained at the second jump frequency $f_3$ in block 78 and the control loops back to the decision block 76. Once any of the conditions have been satisfied, then control advances to a block 80 which continues deceleration using a second deceleration ramp in block 80. The second fallback timer $t_3$ is also reset. The control 16 includes various ramp selections. A first deceleration ramp is regular deceleration stopping as known. The second deceleration ramp is used with the fast stopping method to decelerate from the frequency $f_3$ to zero hertz. Once the frequency has ramped down to zero, then the process stops in block 82.

As is apparent, the operating frequency may be lower than the first jump frequency $f_2$ when the fast stopping method is initiated, as determined at the decision block 62. If so, then a decision block 84 determines if the output frequency is greater than $f_3$. If so, then control advances to a block 86 that initiates the base block timer for $t_1$ second. The inverter 28 is then reengaged to run at $f_3$ at the block 74, discussed above. If the output frequency is not greater than $f_3$, as determined at the decision block 84, then the output frequency is less than or equal to $f_3$, as indicated at the block 88. The control loop then advances directly to the block 80 to implement the second decel ramp, discussed above.

The fast stopping method is now discussed under the assumption that a motor with a large inertial load is operating at 120 Hz. The motor-load is rotating at approximately 3600 rpm (4-pole motor running at 120 Hz) and must be brought to a dead stop. At the desired time of stopping, the control signals to the output IGBTs 29 are removed to initiate the base block. The motor starts to coast. After the programmable coasting time $t_1$, the motor is reenergized with the command speed set at the desired low speed level $f_2$ which is typically one-third of the operating speed at the time of initiating a stop command. The timer $t_2$ starts counting down simultaneously. The DC bus voltage and output current for the second jump are monitored, as shown in FIG. 6. When the motor slows down and the slip reduces in magnitude, the output voltage will tend to increase and if it crosses the preset level then a second base block is initiated, again for $t_1$ seconds. After the programmable coasting time, the motor is reenergized with the second jump speed set at the desired low speed level, $f_3$, which is typically one-third of $f_2$. The timer $t_2$ is reset and the timer $t_3$ is started.

In some instances, the DC bus voltage does not rise fast enough or is not detectable for initiating the second jump. In such a circumstance, the motor speed comes in line with the commanded speed and starts running at $f_2$ instead of coming to a stop. In order to expedite the stopping time under such circumstances, the output current is monitored as discussed above. If the output current falls below ten percent of nominal value, and the second jump has not yet been initiated then the process is started for the second jump by initiating the second base block as shown in FIG. 5 at the block 68. In other words, the second jump will take place if either the DC bus voltage rises above ten percent of the nominal voltage or if the output current falls below ten percent of the nominal output current.

In rare instances, neither the DC bus voltage rise is detectable nor does the current fall below the preset low level. In such a condition, the fallback timer $t_2$ that started counting down after the first frequency jump times itself out. If the output frequency is still higher than zero and $t_2$ has timed itself out, then the second jump process is started by initiating the base block at the block 72 of FIG. 5, as discussed above.

When the motor 18 is operating at $f_3$, the same conditions are evaluated, as noted above.

By implementing the fast stopping method in accordance with the invention, the motor load combination will come to a quick stop. The current into the motor 18 shows large increase during this rapid stopping method. The level of current flowing into the motor directly depends on the modified V/F pattern. Larger values of $V_2$ at $f_2$, in FIG. 6, results in larger current, limited only by the hardware current limit of the inverter 28. Larger current can cause higher temperature rise in the motor 18, which can affect performance. The stopping time achievable with a larger value of $V_2$ is much faster than with a smaller value of $V_2$. The selection of the value for $V_2$ at $f_2$, in FIG. 6, is thus very important and is application-dependent.

It has been observed that, if during the entire stopping method the difference between the actual speed and the commanded speed is high, indicating high slip, the motor successfully achieves low speed without creating DC bus over voltage. Advantageously, high slip is maintained between the actual speed and the commanded speed. The factors that influence the desired high slip condition are over voltage sense level, undercurrent sense level, modified V/F pattern and operating temperature of the motor. The DC bus voltage level should be such that it is much lower than the regular over voltage trip level so that the second jump is initiated much before the actual over voltage trip for the inverter. If this is not done, then the inverter faults out and all control is lost. The undercurrent sense level should be higher than the no-load motor current or else this will never be initiated and the logic becomes ineffective. If the voltage at the first and second jump frequencies is high, then the stator current is high. This can lead to over current trip of the inverter. On the other hand, a lower voltage value results in longer stopping time with lower stator current. The stopping time can be optimized by judiciously choosing the voltage level at the first and second jump frequencies.

The magnitude of stator current flowing into the motor and consequently the stopping time depend on the rotor and stator resistances. Both of these values in turn depend upon the operating temperature. Higher operating temperatures cause the point of zero power return to shift towards larger slip values. Hence, the first and second jump frequencies should be selected to be much lower than the point of zero power return.

Experimental test results using the fast stopping method in accordance with the invention show substantial improvement. A 3.7 kilowatt motor with no brake resistor unit in the inverter, operating at 80 Hz with a load-inertia of about 8 times its rotor inertia, has a typical stopping time of about 9.57 seconds. The best stopping achievable using the fast stopping method is on the order of 2.79 seconds. The fast stopping method with a modified V/F pattern with current held to 120 percent of inverter rating has a stopping time on the order of 7.278 seconds. By manipulating the motor flux, the stator current is reduced. This is achieved by sacrificing the stopping time.

Thus, in accordance with the invention, a new method of braking inertial loads is implemented. The method involves maintaining large slip during the stopping of the motor. Large value of negative slip results in low regenerative torque being produced. Most of the available mechanical energy is converted into heat in the rotor bars, stator windings, and stator core where it is dissipated. There is no use of external resistor banks or encoders. The fast stopping method does not cause DC bus over voltage. In order to control the rotor current in the fast stopping method, the V/F control pattern is modified. The modification, which is effective only for the fast stopping method does not interfere with normal operation. The modification helps to tailor the speed drop profile without causing over voltage trip and maintaining current control over the reflected rotor current. The effect of temperature on the motor performance in the negative slip region, suggests that in order to ensure trip-less operation, it is safer to operate the motor at a negative slip that is more negative than the point of zero power return. The fast stopping method achieves phenomenally fast stopping time with good control over current without creating high DC bus voltage conditions in the inverter.

We claim:

1. A control method for an induction motor operated by a variable frequency drive (VFD), comprising:

controlling the VFD to operate the induction motor at a select commanded operating speed by controlling output frequency of the VFD; and if stopping of the induction motor is initiated, then controlling the VFD to operate the induction motor at a high negative slip condition to rapidly stop rotation of the induction motor.

2. The control method of claim 1 wherein the step of controlling the VFD to operate the induction motor at a high negative slip condition comprises reducing commanded speed to about fifty-five percent of rated speed.

3. The control method of claim 1 wherein the step of controlling the VFD to operate the induction motor at a high negative slip condition comprises reducing commanded speed to provide negative slip of about −0.8.

4. The control method of claim 1 wherein the step of controlling the VFD to operate the induction motor at a high negative slip condition comprises reducing commanded speed corresponding to a reduction of operating frequency to one-third of rated output frequency.

5. The control method of claim 4 wherein the step of controlling the VFD to operate the induction motor at a high negative slip condition comprises additionally reducing commanded speed corresponding to a further reduction of operating frequency to one-third of reduced output frequency in response to a sensed stopping condition.

6. The control method of claim 5 wherein the sensed stopping condition comprises one of DC bus over voltage, induction motor under current and a select lapsed time.

7. A control for an induction motor operated by a variable frequency drive (VFD), comprising:

a control unit adapted to control the VFD in a normal mode to operate at a select commanded operating frequency to control speed of the induction motor, and in a stopping mode at a substantially lower commanded operating frequency to operate the induction motor at a high negative slip condition to rapidly stop rotation of the induction motor.

8. The control of claim 7 wherein the control unit in the stopping mode controls the VFD to operate the induction motor at a high negative slip condition by reducing commanded speed to about fifty-five percent of rated speed.

9. The control of claim 7 wherein the control unit in the stopping mode controls the VFD to operate the induction motor at a high negative slip condition by reducing commanded operating speed to provide negative slip of about −0.8.

10. The control of claim 7 wherein the control unit in the stopping mode controls the VFD to operate the induction motor at a high negative slip condition by reducing commanded operating frequency to one-third of rated output frequency.

11. The control of claim 10 wherein the control unit in the stopping mode controls the VFD to operate the induction motor at a high negative slip condition by additionally reducing commanded operating frequency to one-third of reduced output frequency in response to a sensed stopping condition.

12. The control of claim 11 wherein the sensed stopping condition comprises one of DC bus over voltage, induction motor under current and a select lapsed time.

* * * * *